Nov. 28, 1961  R. H. GUAY  3,010,400
PROPELLANT CHARGE
Filed Oct. 14, 1957

INVENTOR.
R. H. GUAY
BY *Hudson & Young*
ATTORNEYS

United States Patent Office 3,010,400
Patented Nov. 28, 1961

3,010,400
PROPELLANT CHARGE
Roland H. Guay, Waco, Tex., assignor to Phillips
Petroleum Company, a corporation of Delaware
Filed Oct. 14, 1957, Ser. No. 690,161
4 Claims. (Cl. 102—98)

This invention relates to a propellant charge adapted for use in a rocket motor. In one aspect it relates to a sustained-thrust rocket motor having a high total impulse. In another aspect it relates to a solid rocket propellant charge of novel configuration, having a relatively long burning duration and capable of imparting a high total impulse.

Rocket motors utilizing solid propellant may be classified in several categories depending on their size, shape and/or configuration of the charge, and on their utility (i.e., jet-assisted-take-off, booster, sustainer or missile). Each classification has specific problems relating to its requirements and specifications. The present invention generally relates to those rocket motors utilizing large sustainer propellant charges having relatively long burning durations and capable of imparting a high total impulse.

Rocket motors of the sustained-thrust type call for large propellant charges which involve scale-up problems of fabrication and assembly not found in the prior art. Since large sustainer propellant charges may weigh as much as 6,000 pounds or more, difficulties in fabricating and handling such large masses of propellant material are encountered. It is generally not feasible to extrude, mold, or cast a large cylindrical grain of propellant material having such great weight. Recently it has been discovered that this type of propellant charge can be built up from a plurality of smaller grains or blocks of propellant which are easier to fabricate and handle and can be bonded together to form a single, large grain or charge. However, the bonding surfaces between the blocks of propellant in these charges are often so disposed as to cause temporary or complete cessation of combustion ("snuffing"), thus causing the combustion chamber pressure to vary, as the advancing flame front or progressively generated burning surfaces which proceed in substantially parallel layer, encounters these bonding surfaces.

Since a sustainer-type propellant charge is made up from a large, heavy mass of propellant material, this type of charge is particularly susceptible to cracking or fragmentation caused by temperature-induced stresses and strains. Cracking or fragmentation of the propellant material causes an undesirable increase in exposed burning surface area with consequently development of excessive pressures, which results in inefficient operation of the rocket motor and in many cases presents explosion hazards. Moreover, the bonding surfaces between blocks of propellant are often disposed so as to cause cleavage planes with the resultant exposure of more burning surface. Therefore, the assembly of large sustainer-type propellant charges from a plurality of small grains or blocks of propellant must be such as to lessen the possibility of cracking, fragmentation, or cleavage of the propellant material.

Accordingly, an object of our invention is to provide a novel rocket motor of the sustainer-type having a high total impulse, e.g., about 1,000,000 pounds. Another object is to provide a rocket motor loaded with a large sustainer-type propellant charge having a novel configuration. A further object is to provide a novel propellant charge of the sustainer-type having a relatively long burning duration, e.g., 60 seconds. A still further object is to provide a rocket motor of a sustainer-type loaded with a propellant weighing about 6,000 pounds or higher and having a novel configuration which lends itself to ease of assembly and handling in spite of such enormous weight. A still further object is to provide a large propellant charge of the sustainer-type made up from a plurality of wedge-shaped grains or blocks of propellant bonded together in such a manner that the burning of propellant mass can proceed substantially unimpeded in spite of the bonding agent employed between contiguous wedge-shaped grains, thus ensuring a uniform combustion chamber pressure. A further object is to provide a large propellant charge of the sustainer-type made from a plurality of segmented wedge-shaped grains bonded together in such a manner that the occurrences of "snuffing," and cracking, fragmentation or cleavage of propellant are substantially minimized. Other objects and advantages of my invention will become apparent to those skilled in the art from the following discussion, appended claims, and drawing in which:

Figure 1:
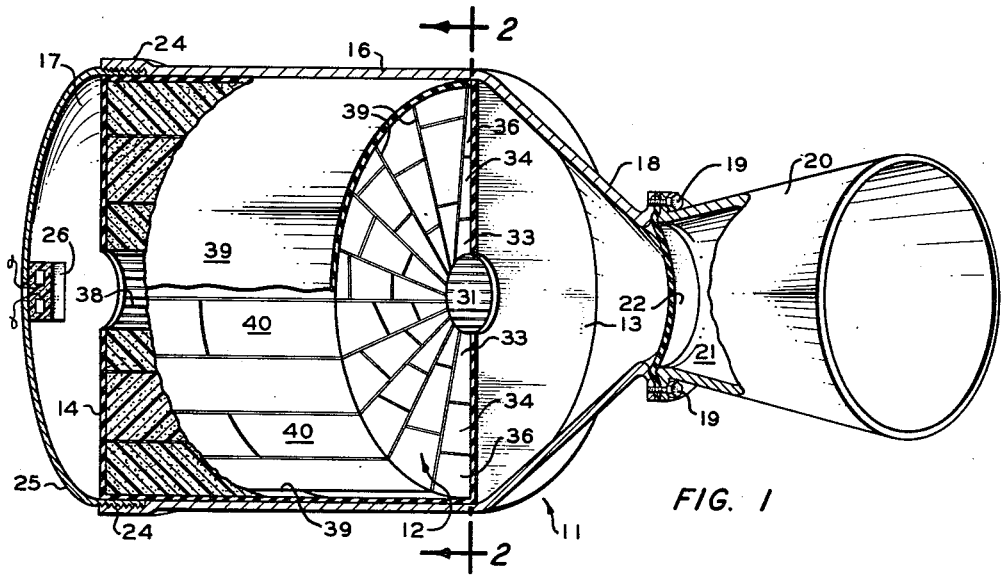
FIGURE 1 is a longitudinal view in elevation and partial section of a sustained type rocket motor having loaded therein a propellant charge fabricated in accordance with the instant invention.

Referring now to the drawing, and to FIGURE 1 in particular, a rocket motor generally designated 11 is shown loaded with an axial perforated composite or built-up propellant charge generally designated 12 bounded on either end by annular restrictor plates 13, 14 which may be made of rubber or other known restricting material. Casing 16 defines in part combustion chamber 17 in which charge 12 is loaded. The rear or aft end of casing 16 is tapered at 18 and connected by bolts 19 or the like to a nozzle portion 20; these members are so constructed as to define a Venturi-like passage 21 for the exhaust of gaseous products from combustion chamber 17. Alternatively, the nozzle portion 20 may be made integral with casing portion 18 instead of the separate portion shown. A blow-out or starter disc 22 is positioned across passage 21 and can be secured at its periphery by the nozzle portion 19 and casing portion 18 by means of bolts 19 or the like. Reduced casing portion 18 can be also fitted with one or more safety plug attachments capable of releasing excessive pressure from the combustion chamber 17 in a manner well known to those skilled in the art. The fore or head portion of casing 16 is preferably constructed in the form of a flange 24 and is secured to a head or closure member 25 by threads, welding or the like. An igniter generally designated 26 can be secured to the inside of closure of member 25, preferably in the center thereof. Igniter 26 can be any of the igniters commonly employed in the rocket art, for example: black powder or other pyrotechnic material contained in a suitable plastic bag or wire mesh material with suitable electro-responsive means, such as squibs or matches, embedded therein. Igniter 26 can be fired by closing a suitable switch in an electric circuit which leads to a power source external to the rocket motor and supplies electrical energy to the electro-responsive means imbedded in the igniter composition.

Figure 3:
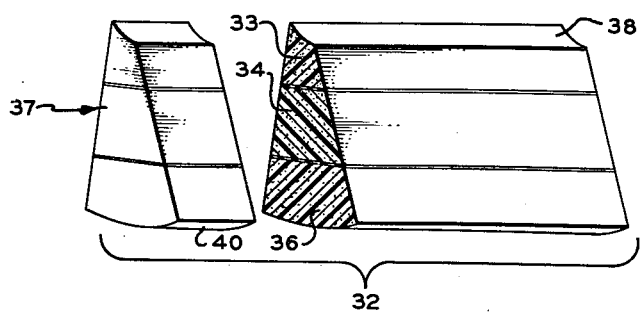
FIGURE 3 is an isometric view in partial section of an individual wedge of propellant such as that illustrated in FIGURES 1 and 2.

Propellant charge 12 has a generally cylindrical configuration with an axial perforation 31. Charge 12 is made up from a plurality of segmented, truncated wedges of propellant, clearly shown in FIGURE 3 and designated 32. Each wedge can extend the entire length of the charge, but preferably these wedges are transversely segmented as shown in the drawing. Preferably each truncated wedge of propellant is in turn made up from a plurality of tandem segments or small blocks of propellant, designated in FIGURE 3 as 33, 34 and 36, the bonding surfaces between the blocks as well as between adjacent wedges being so disposed as to be oblique to the progressively generated burning surface or flame front. The sides 37 of wedges 32 are oblique with respect to the circumference of charge 12 (and likewise oblique with respect to the boundary of propellant defining perforation 31). The concave exposed inner ends 38 of the inner blocks (such as block 33 in FIGURE 3) of the wedges 32 form the charge's initial burning surface and define the axial perforation 31.

Figure 2:
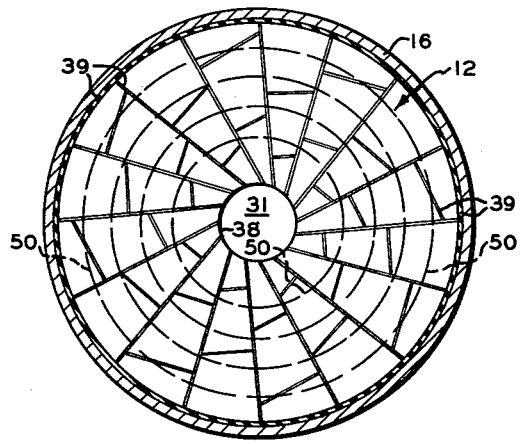
FIGURE 2 is a cross-sectional view of the rocket motor of FIGURE 1 taken along the plane 2—2.

Bonding or adhesive material, hereinafter designated bonding mortar, bonds contiguous surfaces of the blocks in such a manner that each of the blocks (such as 33, 34 and 36) are bonded to each other in the same wedge (such as 32) and the sides 37 of each wedge are bonded to the sides of adjacent wedges. The bonding mortar is designated 39 in the drawing. The bonding mortar also bonds the outer ends 40 of each wedge 32 to the casing 16. Alternatively, the outer ends of each wedge can be bounded to suitable burning restricting material, such as rubber, and the restricting material then bonded to the casing with any suitable adhesive known in the art. The blocks in each wedge 32 can be so sized and arranged that the blocks of one wedge are staggered with respect to the blocks of the adjacent wedges, such as illustrated in FIGURES 1 and 2. The number of wedges employed can be varied, the particular number of wedges and their sizes being dependent upon available fabricating equipment used to extrude, cast or mold the wedges or blocks and the size of the propellant charge desired.

An important aspect of this invention is that the bonding surfaces and mortar between adjacent wedges of propellant is not arranged in a radial direction with respect to the axis of the propellant charge. Rather, the bonding surfaces and mortar between adjacent wedges are arranged in a non-radial manner and oblique with respect to the charge circumference for purposes hereinafter described in detail. Furthermore, the bonding surfaces and mortar between adjacent blocks in each wedge does not lie in the same plane as the bonding surfaces and mortar between blocks of adjacent wedges, due to the staggered arrangement of the blocks in the manner described above.

Figure 4:
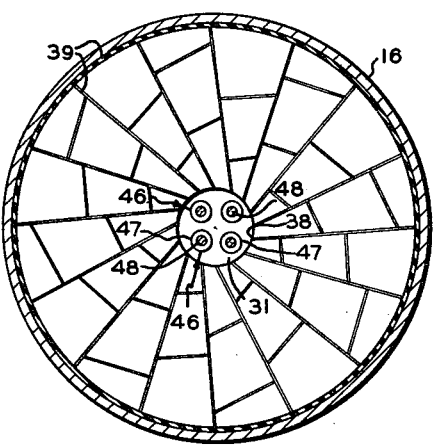
FIGURE 4 is a cross-sectional view similar to FIGURE 2 of another embodiment of the rocket motor of this invention.

Referring to the embodiment shown in FIGURE 4, wherein like reference numerals have been used to designate like parts, one or more cylindrical rods or grains 46 of propellant can be supported and suspended within the axial perforation 31. These rods 46 have their outer cylindrical surfaces 47 exposed. That is, rods 46 can be supported and suspended within perforation 31 by means of axial support rods 48 which extend from either end of the rods 46 and these ends can be secured by nuts or the like to transverse grids or spider means in the rocket motor combustion chamber adjacent both ends of the charge.

In operation, the ignition of the propellant charge 12 of FIGURE 1 is initiated by igniter 26. The resulting flame and combustion gases from this igniter propagate through the length of the axial perforation 31 in a well known manner and the inner surface of the propellant charge 12, defined by the exposed inner ends 38 of the wedges 32, is ignited. Burning of the composite propellant charge then proceeds radially outward from this inner surface. As burning progresses across the web of the charge 12, at no time does the bonding mortar present a complete boundary through which the burning or advancing flame front must progress. Rather, the progressively generated burning surface or flame front encounters only isolated portions of bonding mortar since the bonding agent between adjacent wedges of propellant is non-radial and the bonding agent between blocks in each wedge is not in the same plane with the bonding mortar between the blocks of adjacent wedges due to the staggered arrangement of the block in adjacent wedges. With the provision of a non-continuous bonding surface to the advancing flame front, rather than a bonding surface that is parallel or concentric to the advancing flame front, the occurrence of snuffing or cessation of combustion is minimized, thus rendering the combustion chamber pressure more uniform during burning. In addition, with the charge configuration of this invention, the combustion chamber pressure exerts radial force on the blocks of propellant and thus maintains the bonding surfaces of the blocks under pressure during burning and minimizes the possibility of cleavage between the blocks due to the non-radial bonding surfaces, especially during the ignition phase of the charge. The progressively generated burning surfaces are schematically shown in FIGURE 2 and are designated 50; as clearly shown in FIGURE 2, the contiguous bonded surfaces between the wedges and segments of propellant will always be oblique with respect to the progressively generated burning surfaces 50, as well as oblique with respect to the initial burning surface 38.

The burning rate of the propellant mass can be made variable by incorporating variable amounts of burning rate catalyst in each of the blocks of each wedge and/or by varying the particle size of oxidizer used in fabricating the blocks of each wedge. Where a progressively faster burning rate across the web of the propellant charge is desired, the burning rate catalyst contained in the blocks of each wedge can be progressively greater proceeding outwardly from the axial perforation. For example, the burning rate of block 36 can be greater than that of block 34, which in turn can be greater than that of block 33. Alternatively, the burning rate of the propellant charge across its web can be retrogressive, that is, the burning rate of block 33 can be greater than that of block 34, which in turn can have a burning rate greater than that of block 36. A charge with a constant burning rate can be made from blocks fabricated from the same propellant recipe. In the embodiment shown in FIGURES 1 and 2, it is desired to have a retrogressive burning rate in order that a constant volume of gases are generated as burning progresses through the web so as to impart to the rocket motor a constant thrust.

Where it is desired to have a charge with a high volumetric loading, the propellant charge illustrated in FIGURE 4 can advantageously be employed. The burning of the propellant rods 46 is initiated at the same time as the burning of the inner ends 38 of the wedges, defining the perforation 31, is initiated. As the propellant material of rods 46 is consumed, the propellant mass comprising the inner blocks 33 is consumed.

Although I have described and illustrated a rocket motor loaded with a single composite propellant charge, it is within the scope of this invention to provide a rocket motor utilizing a plurality of such composite propellant charges, aligned for example in a tandem manner within the combustion chamber of a rocket projectile. In addition, I do not intend to limit the propellant charge configuration to that described or illustrated in detail herein and those skilled in the art will recognize configurations other than cylindrical can be adapted according to the operational requirements to be met, without departing from the scope of my invention. Moreover, while I prefer to utilize the composite charge of my invention in the rocket motor of a projectile so as to propel the same, I do not intend to so limit my invention and it is to be understood that the composite propellant charge can be employed for energizing gas pressure systems for the actuation of apparatus of various types, etc.

The propellant material utilized in fabricating the rocket grains of this invention can be prepared from a variety of known compounding materials. Particularly useful propellant compositions which may be utilized in the practice of this invention are of the rubbery copolymer-oxidizer composite type which are plasticized and worked to prepare an extrudable mass. The copolymer can be reinforced with suitable reinforcing agents such as carbon black, silica, and the like. Suitable oxidation inhibitors, wetting agents, modifiers, vulcanizing agents, and accelerators can be added to aid processing and to provide for the curing of the extruded propellant grains at temperatures preferably in the range of 170°–185° F. In addition to the copolymer binder and other ingredients, the propellant composition comprises an oxidizer and a burning rate catalyst.

Solid composite-type propellant compositions particularly useful in the preparation of the propellants used in this invention are prepared by mixing the copolymer with a solid oxidizer, a burning rate catalyst, and various other compounding ingredients so that the reinforced binder forms a continuous phase and the oxidizer a discontinuous phase. The resulting mixture is heated to effect curing of the same.

The copolymers are preferably formed by copolymerization of a vinyl heterocyclic nitrogen compound with an open chain conjugated diene. The conjugated dienes employed are those containing 4 to 6 carbon atoms per molecule and representatively include 1,3-butadiene, isoprene, 2,3-dimethyl-1,3-butadiene, and the like. The vinyl heterocyclic nitrogen compound generally preferred is a monovinyl pyridine or alkyl-substituted monovinylpyridine such as 2-vinylpyridine, 3-vinylpyridine, 4-vinylpyridine, 2-methyl-5-vinylpyridine, 5-ethyl-2-vinylpyridine, 2,4-dimethyl-6-vinylpyridine, and the like. The corresponding compounds in which an alpha-methylvinyl (isopropenyl) group replaces the vinyl group are also applicable.

In the preparation of the copolymers, the amount of conjugated diene employed is in the range between 75 and 95 parts by weight per 100 parts monomers and the vinyl heterocyclic nitrogen is in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML04) plasticity value in the range of 10–40, preferably in the range of 15 to 25, and may be masterbatched with 5–20 parts of Philblack A, a furnace black, per 100 parts of rubber. Masterbatching refers to the method of adding carbon black to the latex before coagulation and coagulating to form a high degree of dispersion of the carbon black in the rubber. In order to facilitate dispersion of the carbon black in the latex Marasperse–CB, or similar surface active agent, is added to the carbon black slurry or to the water used to prepare the slurry.

The oxidizers which can be employed in preparing the propellant compositions preferably are the alkali metal and ammonium salts of perchloric, chloric and nitric acids.

The following empirical formulation of recipe generally represents the class of propellant compositions preferred for the preparation of the propellant grains of this invention.

Table I

| Ingredient | Parts per 100 parts of rubber | Parts by Weight |
|---|---|---|
| Binder | | 10–25 |
| Copolymer Bd/MVP | 100 | |
| Philblack A (a furnace black) | 10–30 | |
| Plasticizer | 10–30 | |
| Silica | 0–20 | |
| Metal oxide | 0–5 | |
| Antioxidant | 0–5 | |
| Wetting agent | 0–2 | |
| Accelerator | 0–2 | |
| Sulfur | 0–2 | |
| Oxidizer (Ammonium nitrate) | | 75–90 |
| Burning rate catalyst | | 0–30 |

Suitable plasticizers useful in preparing these propellant grains include TP–90–B (dibutoxyethoxyethyl formal supplied by Thiokol Corp.); benzophenone; and Pentaryl A (monoamylbiphenyl). Suitable silica preparations include a 10–20 micron size range supplied by Davison Chem. Co.; and Hi-Sil 202, a rubber grade material supplied by Columbia-Southern Chem. Corp. A suitable anti-oxidant is Flexamine, a physical mixture containing 25 percent of a complex diarylamineketone reaction product and 35 percent of N,N'-diphenyl-p-phenylene-diamine, supplied by Naugatuck Chem. Corp. A suitable wetting agent is Aerosol–OT (dioctyl sodium sulfosuccinate, suplied by American Cyanamid Co.). Satisfactory rubber cure accelerators include Philcure 113 (SA–113 N,N-dimethyl-S-tertiary butylsulfenyl dithiocarbamate); Butyl-8 (a dithiocarbamate-type rubber accelerator supplied by R. T. Vanderbilt Co.); and GMF (quinone dioxime, supplied by Naugatuck Chem. Co.). Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamberg blue, laundry blue, washing blue, Williamson blue, and the like. Other burning rate catalysts such as ammonium dichromate, potassium dichromate, sodium dichromate, ammonium molybdate, and the like, can also be used.

The bonding mortar utilized for bonding the individual blocks of propellant to the rocket motor casing and to each other should preferably have a burning rate which is approximately the same as the average burning rate of the composite propellant charge, or for a more refined charge the burning rate of the mortar can be adapted to that of contiguous strats of propellant. Any known bonding material, such as a rubber base cement, can be used for bonding the blocks of propellant. The bonding agent or mortar, however, preferably comprises a compatible rubbery binder preferaby liquid in its uncured state and having incorpoarted therein a low oxidizer content. A series of particularly useful polysulfide liquid polymer formulations which can be employed as binders in the mortar are those such as LP–2, LP–3, and LP–8, prepared by the Thiokol Corp. When these polymers have incorporated therein ammonium perchlorate, which contains a higher percentage of oxygen than ammonium nitrate, low oxidizer loadings must be utilized to limit burning rate to the desirable range of 0.1 to 0.2 inch/sec. These formulations are characterized by their high resiliency due to the nature of the binder and to their relatively low oxidizer content, thereby when blocks of propellant are bonded with mortar made from these formulations they are less susceptible to the effects of shock and temperature induced forces. The bonding material can be cured along with the assembled blocks of propellant. Suitable propellant mortar formulations for the preparation of resilient mortars having burning rates in the range of 0.1 to 0.2 inch per second are:

Table II

| Ingredient: | Weight percent |
|---|---|
| Ammonium perchlorate | 40–60 |
| LP–3[1] | 35–55 |
| p-quinone dioxime | 0–5 |
| Diphenyl quanidine | 0–3 |

[1] A liquid polymer prepared by the Thiokol Corp.

While I have described and illustrated my invention in its preferred embodiments, I do not wish to unnecessarily limit it thereto and various modifications of this invention will become apparent to those skilled in the art without departing from the scope or spirit of my invention.

I claim:

1. A solid propellant charge having a generally cylindrical configuration and an axial perforation, said charge comprising a plurality of circumferentially arranged contiguous truncated wedge-like shapes of propellant, the inner ends of said wedge-like shapes being exposed to form an initial burning surface and defining said perforation, each of said wedge-like shapes comprising a plurality of tandem imperforate segments of propellant circumferentially staggeredly arranged with respect to the segments of adjacent wedge-like shapes, the contiguous surfaces of said wedge-like shapes being bonded together and non-radially disposed with respect to the axis of said charge, and the contiguous surfaces of said segments being bonded together to present non-continuous bonding surfaces to said progressively generated burning surfaces during combustion of said charge.

2. A solid propellant charge having a generally cylindrical configuration and an axial perforation which is circular in cross-section, said charge comprising a plurality of circumferentially arranged inwardly tapered contiguous truncated wedge-like shapes of propellant material of the composite-type, the inner ends of said wedge-like shapes being concave and exposed to form the initial burning surface of said charge and defining said perforation, each of said wdege-like shapes comprising a plurality of tandem imperforate segments of said propellant material circumferentially staggeredly arranged with respect to the segments of adjacent wedge-like shapes, and bonding material bonding contiguous surfaces of said wedge-like shapes and segments, said contiguous surface of said wedge-like shapes being bonded together and non-radially disposed with respect to the axis of said charge, and said contiguous surfaces of said segments being bonded together to present non-continuous bonding surfaces to said progressively generated burning surfaces during combustion of said charge.

3. The propellant charge according to claim 2 wherein said bonding material is an oxidizer-loaded rubber base adhesive.

4. The propellant charge according to claim 2 wherein said composite propellant comprising ammonium nitrate and a copolymer of 1,3-butadiene and 2-methyl-5-vinyl-pyridine.

References Cited in the file of this patent

UNITED STATES PATENTS

| | | |
|---|---|---|
| 677,527 | Maxim | July 2, 1901 |
| 2,440,271 | Hickman | Apr. 27, 1948 |
| 2,813,418 | Miller et al. | Nov. 19, 1957 |
| 2,816,418 | Loedding | Dec. 17, 1957 |
| 2,853,946 | Loedding | Sept. 30, 1958 |

FOREIGN PATENTS

| | | |
|---|---|---|
| 15,363 | Great Britain | July 1, 1909 |